J. E. BENNETT.
SPRING CUSHION TIRED WHEEL.
APPLICATION FILED SEPT. 7, 1916.
1,260,284.
Patented Mar. 19, 1918.
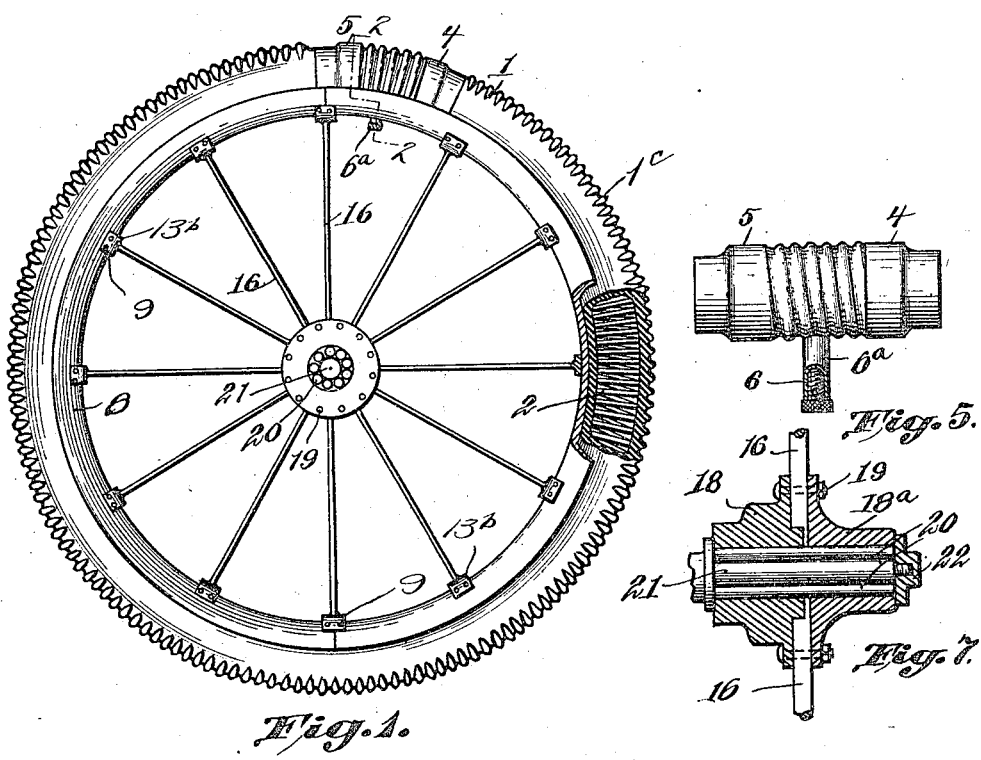
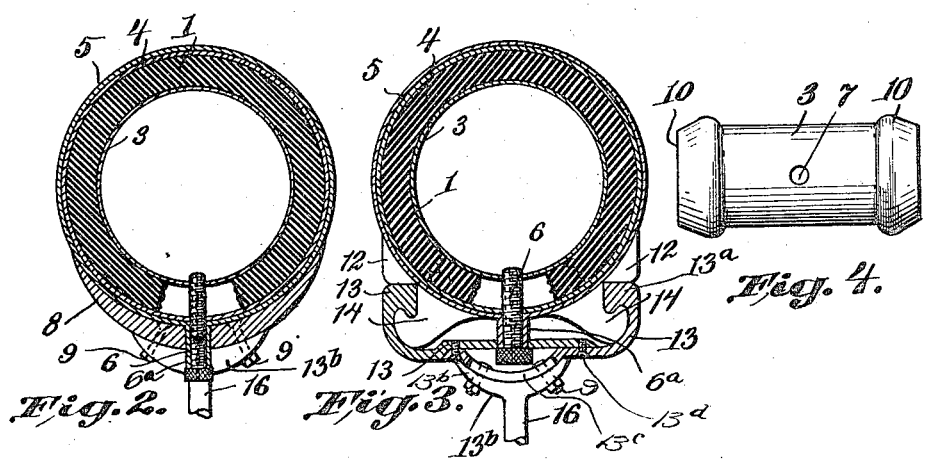
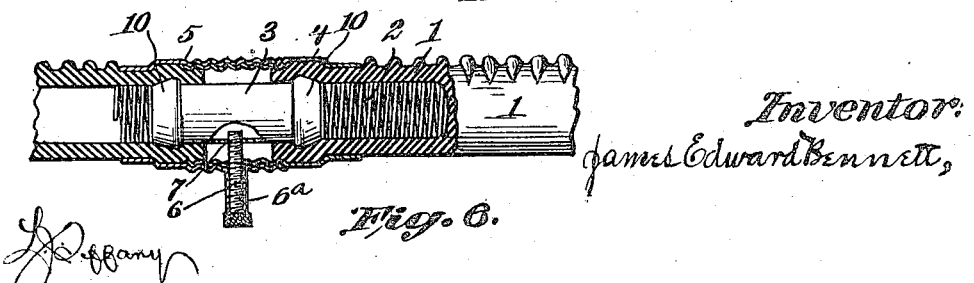
Inventor:
James Edward Bennett,

UNITED STATES PATENT OFFICE.

JAMES EDWARD BENNETT, OF MOMENCE, ILLINOIS.

SPRING-CUSHION-TIRED WHEEL.

1,260,284.  Specification of Letters Patent.  Patented Mar. 19, 1918.

Application filed September 7, 1916. Serial No. 118,808.

*To all whom it may concern:*

Be it known that I, JAMES EDWARD BENNETT, a citizen of the United States, residing at Momence, in the county of Kankakee and State of Illinois, have invented certain new and useful Improvements in a Spring-Cushion-Tired Wheel, of which the following is a specification, reference being made to the accompanying drawings.

My invention relates to resilient tires and wheels and particularly to spring-cushion-tired wheels and the object of my invention is to produce a wheel of this character comprising a hollow rubber tire shell containing an annular coiled spring and suitable connections for the ends of the tire shell and the ends of the spring.

In the drawings—

Figure 1 is a side elevation partly in section of a wheel constructed in accord with my invention; Fig. 2 a cross-section approximately on the line 2—2 of Fig. 1; Fig. 3 a similar view of a modification; Fig. 4 a detail of the connecting nipple or sleeve; Fig. 5 a detail of the connection for the ends of the tire; Fig. 6 a longitudinal section through a connection for the ends of the tire portion; and Fig. 7 a transverse section of the wheel hub.

1 is the hollow rubber shell provided with an appropriate form of anti-slipping tread 1ᶜ, 2 the annular coiled spring therein, 3 a spacing and connecting nipple or sleeve, to receive and position the ends of the coiled spring, 4 and 5 a pair of ferrules, one for each end of the hollow rubber shell, the ferrule 4 screwing into the ferrule 5, to connect the ends of the hollow rubber shell together. The convolutions or ridged portions of the overlapping ferrules, which preferably are of sheet metal, serve as an anti-slipping connection between the ends of the antislipping tread of the tube as well as means for screwing the ends together. 6 is a set screw screwed into a nipple or boss 6ᵃ formed on the outer ferrule 5 and passing through the overlapping portions of the ferrules and into the hole 7 in the nipple or sleeve 3 to secure the several parts in position.

The set screw 6 may be a part of or contain the usual tire inflating valve for the entry of air or carbid, into the tire shell, in the usual manner. The set screw, which in the drawings represents diagrammatically the valve aforesaid, would be the outer hollow shell of the valve, which might be of any well-known form admitting a pump tube screw nipple or ferrule into its head.

8 is the wheel rim and 9 the fastening means such as securing bolts for securing the rim to the spokes 16.

The sleeve 3 is hollow and has open end enlargements 10 into which the ends of the coiled spring are entered and find bearing, being secured therein in any suitable manner.

In the modification the hollow rubber shell is provided with flanges, ridges or bosses 12 resting against the adjacent shoulders 13ᵃ of the overlapping rim sections 13, which, when in position, inclose, clutch and retain between them the flanges, 14 of the hollow rubber shell; the rim sections being secured together by fastenings 13ᵈ and by fastenings 9 to the felly or spoke carrying part 13ᵇ. While I have shown in Fig. 3 the screw 6 as retaining one part of the rim sections and projecting into a cavity formed in the complementary part it is obvious that the nipple and screw could be long enough to project through the entire rim section as in Fig. 2, or that access to the screw could be obtained through a suitable registering hole 13ᶜ, as shown in Fig. 3, these being minor details coming within the scope of my invention.

18 and 18ᵃ are inner and outer hub plates and 19 are the fastenings securing the plates together. These plates inclose a cavity containing roller bearings 20 which surround the end of an axle 21, the axle being secured by cap 22. The plates also receive between them the inner ends of the spokes 16, which are thus clamped in position.

Having thus described my invention the following is what I claim as new therein and desire to secure by Letters Patent:

1. A spring-cushion-tired wheel comprising a hub, spokes, a rim having a hole therein, a hollow rubber tube, an annular coiled spring in the hollow of the tube, fitting against the inner surface thereof and extending practically the whole length of the hollow of the tube, overlapping sheet metal ferrules on the ends of the tube, having perforations adapted to register and receive a screw fastening, for joining the ends of the tube, a hollow sleeve having enlarged end sockets for receiving and securing in position the ends of the annular coiled spring and a perforation in its intermediate portion adapted to receive a screw fastening, a screw threaded nipple formed on one of the ferrules and adapted to register with the perforations in the ferrules and the perforation in the hollow sleeve, and a securing set screw passing through the hole in the rim, the screw threaded nipple, the perforations in the ferrules, and the perforation in the hollow sleeve, for securing the several parts in position.

2. A spring-cushion tire comprising a tube, provided with an anti-slipping tread, and overlapping sheet metal ferrules on the ends of the tube, having ridged portions screw threaded one into the other, the ridged portions adapted to serve as an anti-slipping connection between the ends of the anti-slipping tread of the tube.

3. A spring-cushion tire comprising a hollow rubber tube, an annular coiled spring in the hollow of the tube, fitting against the inner surface thereof and extending practically the whole length of the tube, overlapping sheet metal ferrules on the ends of the tube, having ridged portions screw threading one into the other to secure the ends of the tube together, and having perforations adapted to register and receive a screw fastening means, a hollow sleeve having enlarged end sockets for receiving and securing in position the ends of the annular coiled spring, and having a perforation in its intermediate portion adapted to receive a screw fastening means, a screw threaded nipple formed on one of the ferrules, and a set screw passing through the nipple, the perforations in the ferrules, and the perforation in the hollow sleeve, for securing the several parts in position.

4. A spring-cushion tire comprising a hollow flexible tube having its ends ferruled, the ferrule on one end being screwed into the ferrule on the other end, and the overlapping portions having registering perforations, a coiled spring within the tube having a connecting means provided with a perforation, and a screw fastening means passing through the several perforations for securing the several parts in relative position.

In testimony whereof I affix my signature in presence of two witnesses.

JAMES EDWARD BENNETT.

Witnesses:
E. P. HARNEY,
VIOLA DU FRAIN.

Copies of this patent may be obtained for five cents each, by addressing the "Commissioner of Patents, Washington, D. C."